United States Patent [19]

Smith

[11] B 3,995,868
[45] Dec. 7, 1976

[54] POLYTETRAFLUOROETHYLENE LIP SEAL
[75] Inventor: Robert M. Smith, Dayton, Ohio
[73] Assignee: The Duriron Company, Inc., Dayton, Ohio
[22] Filed: Dec. 20, 1973
[21] Appl. No.: 426,819
[44] Published under the second Trial Voluntary Protest Program on February 17, 1976 as document No. B 426,819.
[52] U.S. Cl. .......................... 277/184; 277/DIG. 6
[51] Int. Cl.² ......................................... F16J 15/32
[58] Field of Search .............. 277/184, 188, 189, 9, 277/DIG. 6

[56] References Cited
UNITED STATES PATENTS

| | | | |
|---|---|---|---|
| 2,743,119 | 4/1956 | Covert et al. | 277/188 |
| 3,118,681 | 1/1964 | Fuehrer | 277/9 |

FOREIGN PATENTS OR APPLICATIONS 928,749  6/1963  United Kingdom .......... 277/DIG. 6

Primary Examiner—Robert I. Smith
Attorney, Agent, or Firm—Biebel, French & Nauman

[57] ABSTRACT

This invention is directed to an improved method of forming and installing polytetrafluoroethylene (PTFE) lip seals and to a novel PTFE lip seal. The lip seals are formed by taking a flat, annular PTFE washer having given dimensions and stretching it over a tapered mandrel by pushing it toward the direction from which the fluid pressure will come in the sealing operation. The finished PTFE lip seals have a curved configuration. Both O.D. and I.D. lip seals are disclosed.

6 Claims, 10 Drawing Figures

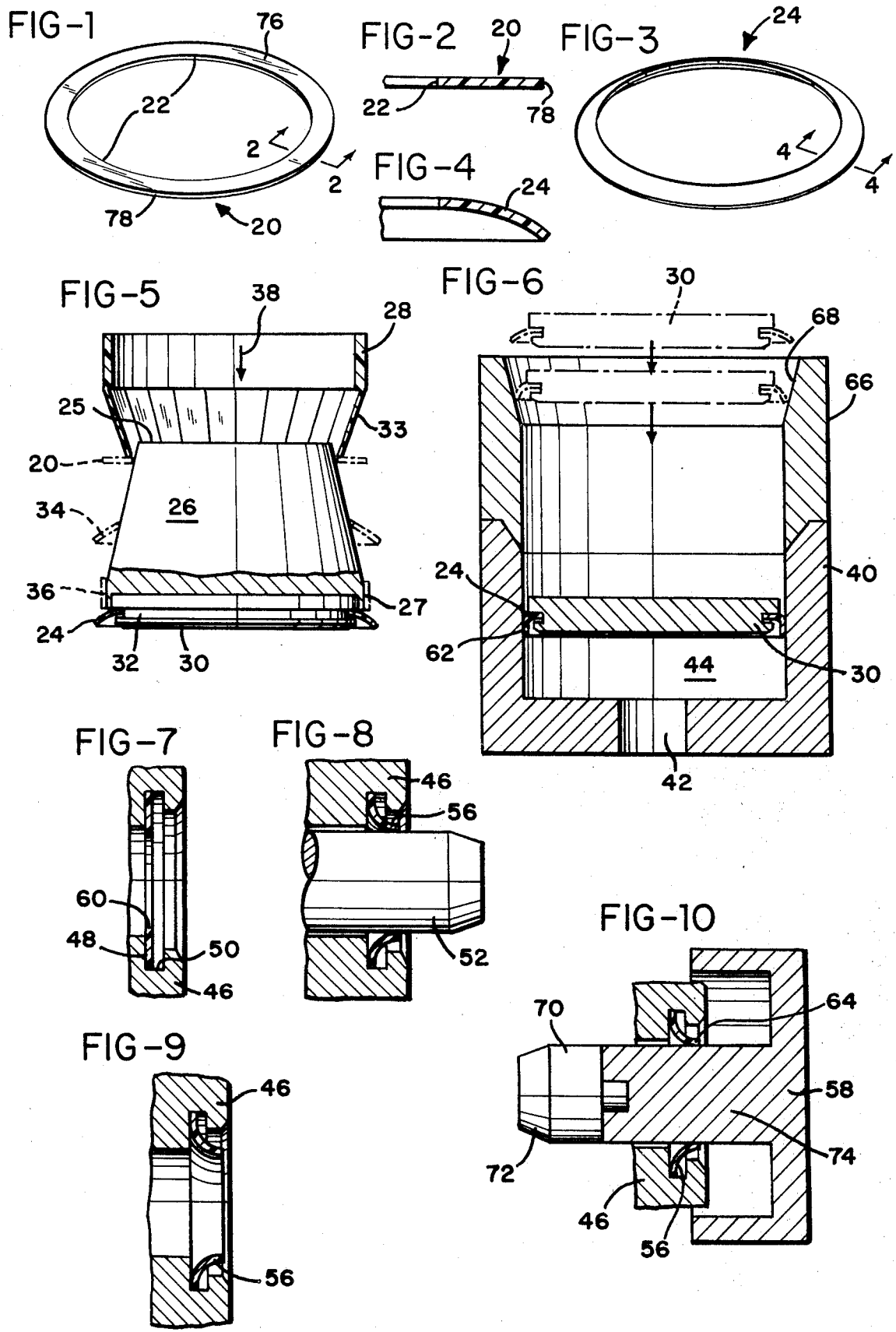

POLYTETRAFLUOROETHYLENE LIP SEAL

BACKGROUND OF THE INVENTION

This invention relates to lip seals and methods of forming and installing them. A preferred application of the lips seals of the invention will be as clutch seals in the automatic transmission of an automobile.

Lip seals are found in applications where an internal seal is needed against a unidirectional fluid flow. This could be, for example, where fluid pressure forces a piston in one direction and the piston is returned by the force of a spring. Generally, the fluid is confined within a chamber and it is the function of the lip seal to prevent the fluid from leaking past the piston via the annular space between the piston and the interior chamber wall.

Automotive clutch seals are reciprocating seals where pressure is applied from one direction and the piston is returned by means of springs. This action results in the activation of various clutch packs.

In addition to automotive clutch seals, lip seals can be used in a multitude of applications. Further, each application may involve a number of lip seals.

Consider, for example, the larger number of automobiles produced every year. Each of these may include an automatic transmission wherein clutch seals are employed. An improvement in lip seals generally, or even clutch seals specifically, which resulted in a small savings in the cost of each seal can become significant when multiplied by the large number of seals employed. An improvement which resulted in an even greater savings per seal would therefore be of even greater economic significance.

Molded rubber lip seals have generally been employed in the past as the seals for unidirectional fluid flow seals. Rubber seals, though, suffer from defects such as thermal embrittlement and stick-slip conditions, are not possessed of an ability to wear for long periods, and have a high coefficient of friction.

Molded or machined polytetrafluoroethylene (hereinafter referred to as PTFE) lip seals overcome some of the defects of the molded rubber lip seals in that they have superior resistance to thermal embrittlement, resistance to stick-slip conditions, and produce less friction resistance and longer wear. However, PTFE is an expensive material of construction for making lip seals, and when such seals are made by the conventional molding process, they are not economically competitive with molded rubber seals.

Because of the expense of the PTFE lip seal, a need exists for a PTFE lip seal which is lower in cost but which retains the superior qualities of PTFE.

DESCRIPTION OF THE PRIOR ART

Molded lip seals are generally ones in which the molding process biases the lip in the direction from which the fluid pressure against which the lip is to seal will come. Thus, the lip seal is enabled, in combination with the surface with which it is in contact, to contain the fluid. Molded lip seals have been made of synthetic rubber or plastics, including PTFE.

A seal which is not molded to impart the strength and bias to enable the seal to act as a lip seal, must be either heavily reinforced or supported in some manner or be of a very stiff material of construction, e.g., metal, otherwise, a flexible, annular seal will not possess sufficient strength to act as a lip seal.

U.S. Pat. No. 3,443,845 discloses a thin, flexible, PTFE lip seal. The lip seal is supported by and bonded to a rigid, plastic, backing support member. The lip seal which is initially in a flat annular shape, is flexed into the sealing shape during assembly onto the stem of the valve wherein it is used. The thin, flexible member is not reformed into the new shape, it is only bent because of its flexibility and it operates, in part, due to the rigid plastic backing member. This patent also discloses that the PTFE may be reinforced with glass fibers, powdered bronze, or the like.

U.S. Pat. No. 2,613,996 discloses a flat, annular, thin metal seal, which is shaped during the installing process to a general frustoconical configuration. There is no mention of the relationship of the inside diameter of the disclosed seal to the outside diameter of the member to which it is applied. It would appear that the metal gives it strength enough to operate as a seal.

U.S. Pat. No. 2,282,312 discloses a flat seal or packing annulus with an interior bevel and teaches a dimensional relationship between the seal and the shape to which it is applied; that is, the largest diameter of the beveled seal aperture registers closely with the diameter of the piston cylinder, while the smallest diameter is smaller in size than the diameter of the piston cylinder. The packing annulus is installed by coning the annulus, placing a retaining plate over the annulus and flattening by pressure.

SUMMARY OF THE INVENTION

The present invention is directed to an improved polytetrafluoroethylene (PTFE) lip seal, an improved method of forming a PTFE lip seal and a method of installing PTFE lip seals. The process will generally consist of taking a flat PTFE washer, i.e., an annulus of PTFE having a flat configuration, pushing it over a tapered mandrel toward the direction from which the fluid pressure will come when the seal is in operation as a fluid pressure seal, and causing it to stretch and assume the curved configuration. The lip seals formed by this process will be stretched annuli of PTFE having the curved configuration. The finished lip seals can be used as either replacements for worn or conventional lip seals or for later installation as a new lip seal if that is desired. Alternatively, the lip seals can be installed in situ, using an apparatus generally having a tapered interior, as a continuing part of the process of forming them.

The preferred use of the PTFE lip seals of the invention will be in automatic automobile transmission clutch seals, however, this invention is not limited to this use and will find application in any instance where a unidirectional internal seal is desired, especially where a slight amount of leakage is allowable.

Two preferred embodiments are disclosed — an OD lip seal and an ID lip seal. In the first embodiment, the OD lip seal, the outer edge of the finished lip seal will contact the inner surface of a chamber in which it operates to create the seal. In the second embodiment, the ID lip seal, the inside edge of the lip seal contacts the outer surface of an inner core of a chamber to form the seal.

In the OD lip seals, the size of the starting washer and the finished lip seal may vary according to need. Lip seals having a diameter of 1.25 inches, or smaller, up to 26 inches, or larger, are attainable using the teachings of the invention. There must be a minimum of 0.100 inch and up to 0.200 inch interference between the inside diameter of the washer and the outside diameter of the groove in which the seal is seated. Interference, in the case of the OD lip seal, means the amount the inside diameter of the washer is smaller than the diameter of the groove in a piston (for example), wherein the seal is to be seated. For example, if the groove surface represents a diameter of 8.000 inches then the washer used to make the lip seal must have an inside diameter of between 7.900 and 7.800 inches and the interference between the washer and the groove is between 0.100 and 0.200 inch. If there is too little interference, the seal will stand straight up and roll over in the wrong direction. If there is too much interference, the seal will pull away from the surface it is suppose to contact and will not allow a seal to be made.

The thickness of the starting OD washer is also of some importance. If the washer is not thick enough, i.e., too thin, it will, after assembly in the groove, have wrinkles which will prohibit the seal from functioning. Thus, washers of over 0.010 inch are necessary. If the washer is too thick, the economic advantage will be lost. If for some reason, the cost is not a deterrent, then thicknesses of 0.025 inch or greater may be used. Generally, however, a thickness of from 0.015 inch to 0.018 inch is preferred.

The width or radial wall of the washer, used to make either the OD or ID seal, should be at least 0.04 inch greater than the maximum clearance between the bore or shaft which it contacts and the bottom of the groove in which it is seated. This will permit sufficient contact between the formed and installed lip seal and the shaft or bore housing to create a good seal. This amount of contact may be as much as 0.16 inch.

The ID embodiment of the PTFE lip seal has similar thickness and radial wall characteristics to the OD lip seal. However, there is no criticality in the interference between the outer diameter of the seal and the groove. Rather, the criticality resides in the relationship of the groove in which the seal is seated, and the thickness of the seal. That is, the thickness is generally 0.015 – 0.018 inches as described in regard to the OD seal and the seal fits a groove that is 0.105 – 0.110 inches. This amount of clearance between the lip seal thickness and the groove width allows the fluid ample room to activate the seal. While a narrower groove would function, it would not permit the lip seal the same type response as a groove of the width mentioned.

The PTFE lip seals of the invention have an advantage over conventional molded lip seals in that expensive molding equipment is not necessary and less PTFE is required than is necessary to produce molded PTFE lip seals. Since less PTFE is necessary to make lip seals according to the principles of the invention, a significant cost savings can be realized. Additionally, installation is easiest since they may be installed as a continuous step in the process of forming them, i.e., immediately after traversing the mandrel.

It is therefore an object of this invention to provide lip seals which retain the advantages of PTFE lip seals over conventional rubber lip seals and yet use less PTFE than molded PTFE lip seals.

It is a further object of this invention to provide a method of forming and installing lip seals which can realize cost savings over conventional molding processes for forming and installing lip seals since expensive molds are not necessary and the installation method may be easily automated.

Other objects and advantages of the invention will be apparent from the following description, the accompanying drawings and the appended claims.

BRIEF DESCRIPTION OF THE DRAWINGS

FIG. 1 is a perspective view of a PTFE washer from which the lip seals of the invention are made;

FIG. 2 is a partial cross-sectional view of the PTFE washer taken along lines 2—2 of FIG. 1 and showing its flat configuration;

FIG. 3 is a perspective view of the finished PTFE lip seal of the invention;

FIG. 4 is a partial cross-sectional view of the finished PTFE lip seal of the invention taken along the lines 4—4 of FIG. 3 and showing its curved configuration;

FIG. 5 is a view, partially in cross-section and partly in elevation, showing a method of making OD PTFE lip seals by a first embodiment of the invention, a possible apparatus for performing that method, and the installing of an OD PTFE lip seal on a piston, one possible use for OD PTFE lip seals;

FIG. 6 is a sectional view of a piston and chamber, one possible use, employing an OD PTFE lip seal, formed in accordance with the invention, and an assembly tool used to assemble said piston in said chamber; and FIGS. 7–10 are cross-sectional views of the steps involved in installing and forming an ID PTFE lip seal, a second embodiment of the invention, according to the teachings of the invention, with FIG. 8 also illustrating the tool used to form the ID PTFE lip seal while it is seated in a piston and FIG. 10 also illustrating the tool used to install the formed PTFE lip seal and piston.

DESCRIPTION OF THE PREFERRED EMBODIMENT

Reference is now made to the drawings and particularly to FIGS. 1 and 2 showing washer 20 which is processed to form PTFE lip seals of the invention. As shown in FIG. 2, washer 20 has a rectangular, flat cross-section. Washer 20 needs to have the proper width or radial walls 76, thickness 78, and necessary degrees of interference 22, as described above, in order to form PTFE lip seals.

Washers 20 can be made, for example, by extruding a tube of PTFE, having a wall thickness equal to the desired width 76, and then slicing to form individual washers having the desired thickness 78. The size of the washer is not critical. Thus, it is possible to make washers to fit automobile clutch pistons, ranging from 1.25 to 8 inches, as well as those which will fit bulldozer clutch pistons of up to 26 inches.

The seal material will be polytetrafluoroethylene (PTFE). The PTFE can be used either by itself or can include fillers or additives, if desired. In selecting the filler material, care should be taken to prevent corrosion or erosion between mating parts. If the mating parts are, for example, aluminum, then a 10% by weight graphite system may be used as the seal material. If the mating parts are cast iron, an acceptable filler can comprise approximately .15% by weight of glass particles or fibers. Variances may be made in the amounts, e.g., 25–50% by weight of glass particles or fibers may be used, etc., and kinds of fillers, e.g., copper, etc., depending upon the parts involved and their intended use.

Once PTFE washer 20 has been stretched over a tapered mandrel, as will be described hereinafter in more detail, the finished PTFE lip 24 (shown in FIG. 3) will have a curved configuration as appears in FIG. 4. Whether the PTFE lip seal is formed as an OD lip seal, a first embodiment, or an ID lip seal, a second embodiment, it will have the shape illustrated in FIGS. 3 and 4. The so formed PTFE lip seal can be sold, as is, as a replacement for worn lip seals or conventional lip seals or for later installation as a new lip seal. Alternatively, as an integral part of the process of making the lip seal, it can be installed in place as it is formed.

It is theorized that pushing the washer on the tapered mandrel imparts differential, but uniform, stresses to the washer causing to assume the curved configuration of a finished PTFE lip seal. While this theory is generally thought to be what happens to form the washer into a finished lip seal, it is to be understood that the explanation is only for the purpose of understanding the invention and that the invention is not to be bound by or limited to this theory.

FIG. 5 illustrates the method by which an OD lip seal is formed and installed on, for example, a piston as a continuous process. As shown in FIG. 5, PTFE washer 20 is placed on the smallest end 25 of tapered mandrel 26. Flexible pusher 28 having flexible fingers 33 is used to push washer 20 toward the direction from which the fluid pressure will come. Arrow 38 indicates the direction in which the washer is pushed. As washer 20 traverses mandrel 26 it is stretched, passing through first intermediate stage 34 and second intermediate stage 36 until it becomes finished lip seal 24.

Tapered mandrel 26 on which PTFE washer 20 is formed into lip seal 24 is generally a frustum-like object. The angle of the taper is not critical. The size will vary according to the size of the lip seal desired. The smallest diameter 25 of the mandrel (its top) will generally be slightly less than the inside diameter of the washer so that the washer fits over it easily. The largest diameter 27 of mandrel 26 will generally be the same or slightly larger than, e.g., 0.05 inch larger than, the item on which the seal is seated.

FIG. 5 also illustrates the process by which the finished lip seal can be pushed onto the piston 30 where it becomes seated in groove 32 as a continuous and additional step of forming lip seal 24. In doing so, the piston 30 is merely placed in abutting relationship with the larger end 27 of mandrel 26 to receive the finished lip seal 24. If it is desired to not have lip seal 24 installed immediately after it is formed, the lip seals need only be collected as they come off the larger end 27 of mandrel 26. In that instance, piston 30 would not abut against mandrel 26 and some suitable collection means (not illustrated) could be used. These formed lip seals may then be installed at any time later as either a new or replacement part.

There is no criticality in the materials of construction for tool 28, mandrel 26, or flexible fingers 33. Generally, tool 28 may be constructed of nylon, PTFE, hard rubber, or a similar material. Its only purpose is to keep in contact with and apply continuous pressure to the edge of seal 20 in order to push it on and across mandrel 26 so that it becomes stretched to form finished lip seal 24. Mandrel 26 may be made of metal or plastic, including rigid PTFE, or any other suitable rigid material.

FIG. 6 illustrates the final assembly stage. To insert piston 30 inside chamber 40 (which could be, for example, a clutch cylinder of an automatic transmission in an automobile) assembly tool 66 having a tapered bore 68 is placed in abutting and axial alignment with chamber 40, wherein piston 30 is to be installed. Tapered interior of bore 68 causes lip seal 24 to continue to bend in the direction in which the fluid pressure will come and into contact 62 with the wall of the chamber to be sealed. In the operation of chamber 40, of FIG. 6, a fluid enters chamber 40, by opening 42, filling interior 44. Lip seal 24 substantially prevents leakage of the fluid past piston 30 because of its contact at 62 with the interior wall of chamber 40.

FIGS. 7-10 illustrate the forming and installing of an ID PTFE lip seal, a second embodiment of the invention. FIG. 7 shows a PTFE washer 48, similar to that shown in FIG. 1, seated in groove 50 of piston 46. As mentioned previously, the formation of a properly functioning ID PTFE seal is made possible by the thickness 60 of washer 48 in relationship to the width of groove 50.

FIG. 8 illustrates formation of the finished lip seal 56 by pushing mandrel 52 through the middle of washer 48 (FIG. 7), which is seated in groove 50 of piston 46. Mandrel 52 is similar to mandrel 26 in FIG. 5, but in the case of the ID seal, mandrel 52 is moved relative to the washer rather than the washer being pushed over the mandrel. Mandrel 52 is pushed toward the direction from which the fluid pressure will come. FIG. 9 illustrates finished ID PTFE lip seal 56 seated in piston 46.

FIG. 10 illustrates the final assembly steps for installing piston 46, having ID PTFE lip seal 56, in chamber 58, which possess the surface to be sealed by the contact area 64 of lip seal 56.

In the assembly process, in the case of the ID PTFE seal, assembly tool 70 having tapered surface 72 is brought into abutting and axial alignment with core 74 of chamber 58. Tapered surface 72 acts to further bend lip seal 56 into contact 64 with the surface of core 74.

The seals of the present invention have low initial and running friction throughout a wide range of temperatures. In addition, seals made in accordance with this invention were tested from −40°F to +300°F using transmission parts for the mating parts. The leakage throughout the full temperature range did not exceed 0.1 gallon per minute. While the PTFE lip seals of the instant invention have been discussed primarily in automobile transmissions, they may be used in any system where the seal application is a unidirectional internal seal (i.e., as in compressors). The various other uses of the present invention will be readily apparent to those skilled in the art.

While the methods and forms of apparatus herein described constitute preferred embodiments of this invention, it is to be understood that the invention is not limited to these precise methods and forms of apparatus, and that changes may be made therein without departing from the scope of the invention.

What is claimed is:

1. A polytetrafluoroethylene lip seal for use as an O.D. lip seal on a part having an annular groove formed therein and adapted to fit within a bore, said lip seal to seal against unidirectional fluid flow between said part and said bore, comprising a curved, unitary, internally stressed polytetrafluoroethylene frusto-conical shape stretch-formed from a flat annulus having a substantially uniform thickness of at least 0.010 inch but less than the width of the groove into which said lip seal is to sit, an interference between the inside diameter of the seal and the outside diameter of the part to which it is attached of between 0.100 inch and 0.200 inch and an annulus width of at least 0.04 inch greater than the maximum clearance between the bore which it contacts and the bottom of the groove in which the lip seal sits.

2. The lip seal of claim 1 wherein the polytetrafluoroethylene contains a glass filler.

3. A polytetrafluoroethylene lip seal for use as an ID lip seal adapted to fit a part having a receiving groove 0.105–0.110 inch in width to seal against unidirectional fluid flow between said part and a mating part, comprising a curved, unitary, internally stressed polytetrafluoroethylene frusto-conical shape stretch-formed from a flat annulus having a substantially uniform thickness of between 0.015–0.018 inch and an annulus width of at least 0.04 inch greater than the maximum clearance between the mating part and the bottom of the groove in which the lip seal sits.

4. The lip seal of claim 3 wherein the polytetrafluoroethylene contains a glass filler.

5. In a piston-bore arrangement wherein unidirectional fluid pressure is encountered, a piston having an annular groove formed in the outside circumference thereof and adapted to fit within the bore, said piston having an O.D. lip seal fitted in said groove to seal against the unidirectional fluid flow between said piston and said bore, said lip seal comprising a curved, unitary, internally stressed polytetrafluoroethylene frusto-conical shape stretch-formed from a flat annulus having a substantially uniform thickness of at least 0.010 inch but less than the width of said groove, an interference between the inside diameter of the lip seal and the outside diameter of said piston at the bottom of said groove of between 0.100 inch and 0.200 inch and an annulus width of at least 0.04 inch greater than the maximum clearance between said bore and the bottom of said groove.

6. In a piston-core arrangement wherein unidirectional fluid pressure is encountered, a piston with a central opening having an annular groove formed in the inside circumference thereof and adapted to fit over the core, said piston having an I.D. lip seal fitted in said groove to seal against the unidirectional fluid flow between said piston and said core, said lip seal comprising a curved, unitary, internally stressed polytetrafluoroethylene frusto-conical shape stretch-formed from a flat annulus having a substantially uniform thickness of between 0.015–0.018 inch and an annulus width of at least 0.04 inch greater than the maximum clearance between said core and the bottom of said groove.

* * * * *